United States Patent [19]
Sloot et al.

[11] Patent Number: 6,086,938
[45] Date of Patent: Jul. 11, 2000

[54] PROCESS FOR PREPARING AN EMULSION CONCENTRATE FOR SOFT DRINKS, THE RESULTANT CONCENTRATE AND SOFT DRINK OBTAINABLE THEREFROM

[75] Inventors: Engelbertus Albertus Sloot, Hilversum; Jacobus Johannes Burger, Almere; Erwin Van De Kamp, Harderwijk; Diederik Johannes Maria Schmedding, Kortenhoef, all of Netherlands

[73] Assignee: Quest International B.V., Naarden, Netherlands

[21] Appl. No.: 09/219,361

[22] Filed: Dec. 23, 1998

[30] Foreign Application Priority Data

Dec. 24, 1997 [EP] European Pat. Off. .............. 97204109

[51] Int. Cl.$^7$ ................................. A23L 2/56; A23L 2/62
[52] U.S. Cl. .......................... 426/590; 426/599; 426/602; 426/616; 426/651
[58] Field of Search .................................. 426/590, 599, 426/602, 651, 616

[56] References Cited

U.S. PATENT DOCUMENTS 3,660,105  5/1972  Kesterson et al. ...................... 426/616

*Primary Examiner*—Helen Pratt
*Attorney, Agent, or Firm*—Pillsbury Madison & Sutro LLP

[57] ABSTRACT

The invention provides a process for the preparation of an emulsion concentrate for soft drinks by emulsifying in an aqueous extract of crushed defatted seeds from edible fruit, a flavor mixture which contains an essential oil of the peel of least one citrus fruit and/or an organoleptically neutral oil. Citrus fruit is preferred. Preferably the oil/solids ratio is from 1.5:1 to 5:1. Preferably the citrus fruit seeds are orange (*Citrus aurantium*) seeds and/or grapefruit (*Citrus paradisi*) seeds. The emulsion concentrate may further contain estergum, damar resin and/or sucrose diacetyl hexaisobutyrate. Preferably the aqueous phase of the emulsion concentrate is adjusted to a pH between 2.5 and 6, more preferably by the addition of citric acid. The invention further provides an emulsion concentrate so prepared as well as a soft drink obtainable by diluting the emulsion concentrate.

16 Claims, No Drawings

PROCESS FOR PREPARING AN EMULSION CONCENTRATE FOR SOFT DRINKS, THE RESULTANT CONCENTRATE AND SOFT DRINK OBTAINABLE THEREFROM

This invention relates to an emulsion concentrate for soft drinks, a process for the preparation thereof and soft drinks prepared from the emulsion concentrate. Soft drinks are herein defined as drinks like cola and drinks with citrus fruit constituents like lemon, lime, orange, grape fruit etc. These soft drinks may contain a minor amount (e.g. less than 7 wt %) of ethanol. Early concentrated systems to prepare such drinks contained citrus juice, flavour and sometimes colourants. More recently juice free alternatives and alternatives containing smaller amounts of juice have been developed. The present invention concerns especially drinks and beverages with natural citrus fruit ingredients and concentrates therefor which contain less than 10, preferably less than 5% of single juice, more preferably they are juice free. These products are primarily based on the essential oils from the peel of the fruits, e.g. orange oil, lemon oil, etc. and/or nature identical equivalents thereof.

These products and their preparation is described in more detail in Food emulsions by K. Larsson and S. E. Friberg, Chapter 10: "Beverage emulsions", also by Chee-Teck Tan and Chee-Teck Tan and Joanna Wu Holmes in Perfumer & Flavorist Vol 13 23–41 (1988). One method for producing soft drinks with the flavour of citrus fruit is to convert the essential oil into an emulsion concentrate for soft drinks, which can be conveniently further processed to the finished highly diluted beverage or drink. Usually the emulsion concentrate is diluted in a sugar or sweetener solution to produce the finished beverage, the soft drink. The soft drink can be either a still drink or a carbonated drink. The emulsion concentrate preferably imparts desirable properties to the soft drink such flavour, cloudy appearance and colour. Moreover the emulsion concentrate should have a desirable emulsion stability upon storage, no or minimal separation into layers, no or minimal creaming (ringing) in the bottle, no or minimal flocculation or coalescence etc are desirable. Obtaining satisfactory stable emulsion concentrates for soft drinks has been a problem for a long time. Several types of additives to improve the stability have been in use for a long time. One reason for instability of the emulsion concentrate is the fact that the specific gravity of the essential oil is considerably lower than the specific gravity of the continuous aqueous phase so that the oil droplets have the tendency to cream. That is why weighting agents which dissolve in and thereby increase the specific gravity of the essential oil component have been proposed. Many weighting agents have been suggested such as bromated vegetable oil, ester gum (obtainable by esterifying rosin with food grade glycerol purified by steam stripping), damar gum (natural exudates from shrubs belonging to the Dipterocarpaceae family), SAIB=sucrose acetate isobutyrate (primarily 6,6'-diacetyl-2,3,4,1',3',4'-hexaisobutyrate), sucrose octa-isobutyrate, sucrose octa-acetate, sucrose hepta-isobutyrate, sucrose octa-propionate, propylene glycol dibenzoate, glycerol tribenzoate, glycerol ester of hydrogenated rosin and methyl ester of hydrogenated rosin.

Furthermore the emulsion concentrates for soft drinks and the soft drinks themselves as well are normally stabilized by the incorporation in the aqueous phase of a hydrocolloid. Suitable hydrocolloids are gums like gum arabic, gum tragacanth, modified starch and locust bean gum. Frequently the use of hydrocolloids is combined with the use of weighting agents.

However, the use of these additives has its disadvantages and consumers often favour products with no additives. Therefore considerable efforts have been made to restrict the volume and number of additives in foods and drinks. Of course "additives" which are naturally present in food materials are more readily accepted by the public at large than chemical or modified additives.

It is therefore an object of the present invention to provide a consumer-friendly emulsion concentrate for soft drinks and finished soft drinks which contain less or preferably no chemical and/or modified additives.

Several attempts have already been made to prepare ingredients for emulsion concentrates for soft drinks from citrus waste materials, however sofar only with limited success.

E.g. in Journal of Fermentation and Bioengineering, Vol. 80, 190–94 (1995), H. K. Screenath, P. G. Crandal and R. A. Baker describe a process in which concentrated peel juices are fermented, subjected to pectolytic treatment and extraction with alcohol. Although after two months no off-flavour could sensorially be detected final beverages containing this ingredient suffered from a limited visual stability.

In Die Nährung Vol 38, 158–66 (1994), Z. El Shamei and M. El Zoghbi describe a natural clouding agent prepared by treatment of orange and lemon peel with pectolytic enzymes.

The product obtained showed browning reactions and therefore had to be kept refrigerated. Moreover large quantities were required to be effective.

In American Perfumer Vol 84, 38–39, (1969) J. W. Kesterson and R. Hendrickson describe a clouding agent for soft drinks based on crushed citrus seeds from which the hulls had been removed. Sometimes the seeds were (partially) defatted before being crushed and/or milled. The solid material thus obtained served as a clouding agent in emulsion concentrates for soft drinks.

The present invention therefore provides in a first embodiment a process for the preparation of an emulsion concentrate for soft drinks comprising emulsifying in an aqueous extract of crushed defatted seeds from edible fruits, a flavour mixture comprising an essential oil of the peel of least one citrus fruit and/or an organoleptically neutral edible oil. Suitable edible seeds are from citrus fruit, apple, pear, berries, currants etc. Seeds from perannual fruit plants (especially from shrubs and trees) are preferred, seeds from citrus fruit are especially preferred. Stone fruits may be less suitable as they may contain amygdalin.

An emulsion concentrate for soft drinks is any emulsion for soft drinks which is more concentrated than the finished soft drink. An aqueous extract of crushed defatted seeds from an edible plant is an extract containing water-soluble citrus seed material and which has preferably been centrifuged and/or filtered to remove solid particles. When preparing this extract the starting material can be citrus waste material from the production of juice including seeds, peel and other solid material, but preferably the seeds have been concentrated or more preferably isolated. The waste material is then dried and extracted with an organic solvent to extract fats using e.g. an alkane solvent, acetone, nitropropane etc. The defatted seeds are collected, the remaining solvent removed and crushed (which includes herein milled, powdered etc). The crushed seeds are then extracted with an aqueous medium containing a food acid e.g. citric acid. The weight ratio of aqueous extraction medium to dry, defatted crushed seeds is usually is usually from 3:1 to 20:1, preferably from 1:1 to 10:1. The temperature at which the extraction takes place and the time of extraction are interrelated. The mixture of crushed seeds and acidified water is slushed during several hours at a temperature at which part of crushed seeds dissolves easily in water, e.g. 24 hours at 40° C. is a favourable combination. Removal of remaining solid material is effected by sieving, centrifuging and/or filtering which may leave some harmless fines. The amount of water-soluble material extracted from the crushed seeds in the aqueous extract usually lies between 1 and 10 wt %. It is the water-soluble material obtained which seems to act like a protective layer around the oil droplets ("Schutzkolloid") that stabilizes the emulsion. Under citrus fruit is to be understood fruits from the Citrus family like orange, grape fruit, lemon, lime and tangerine. Seeds from lemon (*Citrus auranticus*) and orange (*Citrus paradisi*) are preferred starting materials.

The organoleptically neutral edible oil is usually an oil of vegetable origin which is liquid at room temperature and preferably also at +5° C. More preferably this oil is a medium chain triglyceride that is an oil based on natural oils of the lauric group (coconut oil, palm kernel oil and/or babussa oil which are high in C12 and C14 fatty acids). It is also possible to replace these triglyceride oils by edible substances that are physically similar to triglycerides such as waxes, e.g. jojoba oil and poly fatty acid esters of mono- or di-saccharides, and that can be used as replacement for or in admixture with triglycerides.

Especially sucrose poly fatty acid ester of suitable melting point can be used for this purpose.

One of the main advantages of the present invention is that a stable, more natural product is made available.

The oil phase is usually pre-emulsified in the water phase using a high shear mixer. The final droplet diameter can be obtained by a number of passes over a high pressure homogenizer. This final average droplet diameter, which is preferably below 2 microns, can be determined by equipment based on forward laser light scattering as for example from Leeds & Northrup under the name Microtrac.

According to a preferred embodiment of the invention the emulsion concentrate is prepared from an aqueous extract of crushed defatted citrus seeds and a flavour mixture comprising an essential oil of the peel of least one citrus fruit and/or an organoleptically neutral triglyceride oil in an oil to solids weight ratio from 1.5:1 to 5:1, preferably from 2:1 to 3.5:1.

According to a preferred embodiment of the invention the aqueous extract is prepared from ungerminated citrus fruit seeds. More preferably the citrus fruit seeds comprise orange (*Citrus aurantium*) seeds and/or grapefruit (*Citrus paradisi*) seeds.

According to a preferred embodiment of the invention the emulsion concentrate also comprises a weighting agent in the oil phase, preferably estergum, damar resin and/or sucrose diacetyl hexaisobutyrate.

Although it is possible to carry out the emulsification of the oil phase in water phase in one step it is preferred to carry out the emulsification in two stages in which a pre-mix is homogenized to a stable emulsion.

According to a preferred embodiment of the invention the aqueous phase of the emulsion concentrate is adjusted to a pH between 2.5 and 6, preferably between 3.5 and 5.

More preferably the pH adjustment is effected by the addition of a food grade acid, in particular citric acid, lactic acid and/or malic acid. Most preferably citric acid is employed.

According to another embodiment the invention provides a process for the preparation of a soft drink in which an emulsion concentrate prepared according to any of the preceding claims is diluted with an acidified aqueous solution of a sugar or an artificial sweetener.

The acidified aqueous solution may also contain other additives normally used in soft drinks such as colourants, preserving agents, anti-oxidants etc. It is also possible to include ethanol e.g. as to obtain a toddy concentrate.

According to another embodiment the invention provides an emulsion concentrate comprising an aqueous extract of crushed defatted citrus seeds as the continuous phase of a flavour mixture comprising an essential oil of the peel of least one citrus fruit and/or an organoleptically neutral triglyceride oil as the discontinuous phase.

According to another embodiment the invention provides a soft drink obtainable by diluting an emulsion concentrate as described above with an acidified aqueous solution of a sugar or an artificial sweetener.

The invention will now be illustrated by the following examples. All percentages and parts mentioned are taken on a weight basis unless otherwise is indicated.

EXAMPLE 1

Orange seeds were defatted using n-hexane (pro analysis quality). The defatted seeds were ground using a hammer mill. 100 grams of the defatted milled citrus seeds were mixed with 300 ml water which was previously acidified with citric acid to pH 4. The thus obtained mixture was slushed at room temperature for 8 hours. After this extraction process, large solid residual particles were removed by centrifuging at 4000 g. The supernatant was cleared by passing through a filter. Sodium benzoate was added to the filtrate in order to preserve the solution against microbiological contamination. The solids content of the final aqueous extract was 3.7%.

400 grams of the aqueous extract obtained as described above was mixed with 600 grams liquid of the same composition as was used for the extraction process above. In the thus prepared water phase, a solution of 25 grams ester gum in 25 grams of limonene was pre-emulsified. Pre-emulsifying was effected at room temperature using a high shear mixer at 7500 rpm during 5 minutes. The final particle size was reached by 1 pass at 200 bar and 1 pass at 5 MPa (50 bar) over a high pressure homogenizer.

The particle size of this final emulsion concentrate for soft drinks was determined using a Leeds & Northrup Microtrac type FRA. The mean volume diameter of the distribution was found to be 0.85 micrometer.

EXAMPLE 2

In order to prepare an emulsion concentrate useful as a beverage syrup, 700 ml of an aqueous sugar syrup, containing 67% of sucrose, was mixed with 4 ml of a 25% solution of sodium benzoate in water and 20 ml of a 50% solution of citric acid in water.

20 grams of the emulsion, prepared according to the method of Example 1, were mixed with 80 grams of water. This mixture was slowly added to the acidified sugar syrup whilst gently mixing with a simple stirrer. Water was added to this mixture up to a total volume of 1000 ml.

To this emulsion concentrate for soft drinks, useful as a beverage syrup, 5000 ml of previously carbonized water was added to prepare the final beverage. The beverage was bottled in 330 ml bottles, which were closed with a crown cork with a foam inlay. An panel of experts gave the beverages a very positive rating for sensorial behaviour.

EXAMPLE 3

Defatted grape fruit seeds were extracted using the method of Example 1. The solid content of the final aqueous extract was 4.2%. 500 grams of this grapefruit seed extract were mixed with 500 grams of the extraction liquid of Ex. 1. Using this water phase, an emulsion was prepared with 50 grams of an organoleptically neutral medium chain (mainly based on lauric fatty acids) triglyceride. The method of emulsification was the same as the method described in Example 1. The mean particle size of this emulsion concentrate for soft drinks was 1.65 micrometers. Final beverages have been prepared according to the method as described in example 2. A panel of experts gave the beverages an excellent rating for sensorial behaviour.

EXAMPLE 4

50 grams of a mixture of single fold orange oil, single fold lemon oil and single fold tangerine oil was emulsified in 800 grams of the aqueous extract of grapefruit seeds, prepared according to Example 3. The method of emulsification was as described in example 1. The mean volume diameter of this emulsion concentrate for soft drinks was 1.35 microns. Single fold lemon (or tangerine) oil is the essential oil directly obtained from the fruit and consists usually of 2–5% organoleptically active oxygen containing compounds and further mainly of terpenes like limonene.)

Storage Experiments

All final beverages were stored at room temperature in diffuse day light. The visual stability was observed at regular intervals. The beverage prepared according to the method described as Example 2 remained perfectly stable during a storing period of up to three months.

The beverages prepared according to the method of Example 3 remained stable during three weeks. After that a significant oily separation layer was detected in the neck of the bottles.

The beverages prepared according to the method described in Example 4 showed after two weeks a lifting of all cloudy constituents. At the top of the liquid, an oily ring was visible after three weeks.

EXAMPLE 5

Grape seed containing 4.5% wt % of fat were milled in a hammer mill and then defatted with n. hexane (pro analysis quality). 600 g of the milled defatted seed were mixed with 2000 ml water, which was previously acidified with 40 ml of an aqueous citric acid solution (50 wt %) and 4 ml of an aqueous sodium benzoate solution (25 wt %) were added. The mixture was slushed for 2 hours at room temperature whilst stirring gently. The large solid residual particles were removed by centrifuging at 4000 g. The supernatant was cleared by passing through a filter. The solids content of the final aqueous extract was 2.7%.

1000 g of the final aqueous extract were mixed with 50 g natural orange peel oil (terpene oil) and the mixture was stirred for 30 minutes, followed by homogenization in a high pressure homogenizer one pass at 5 MPa followed by three passes at 15 MPa. The extract obtained was low viscous when compared with orange seed extract described above. The solids content was 2.7 wt % compared with 4.4% for a typical orange seed extract. The average particle size of the extract was relatively coarse when compared with an orange seed extract, but the particle size remained stable over the time. By using the procedure described in Example 2 a stable beverage was prepared.

In a similar way a useful extract could be prepared from apple pits.

What is claimed is:

1. Process for the preparation of an emulsion concentrate for soft drinks which comprises emulsifying a flavour mixture comprising at least one member of the group consisting of an essential oil of the peel of least one citrus fruit and an organoleptically neutral oil, in an aqueous extract of crushed defatted seeds from edible fruit.

2. Process according to claim 1, in which the emulsion concentrate has an oil/solids ratio from 1.5:1 to 5:1.

3. Process according to claim 2 wherein the oil/solids ratio is from 2:1 to 3.5:1 and the extract is prepared from citrus fruit seeds.

4. Process according to claim 1, in which the aqueous seed extract is prepared from ungerminated seeds from edible fruit.

5. Process according to claim 1, in which the fruit seeds comprise at least one member of the group consisting of orange (*Citrus aurantium*) seeds and grapefruit (*Citrus paradisi*) seeds.

6. Process according to claim 1, in which prior to emulsifying a weighting agent is incorporated in the essential oil.

7. Process according to claim 6, in which the weighting agent is selected from the group consisting of estergum, damar resin and sucrose diacetyl hexaisobuturate.

8. Process according to claim 1, in which emulsifying is carried out in two stages which comprise preparing a premix of the flavour mixture and the aqueous extract and homogenizing said pre-mix to form a stable emulsion.

9. Process according to claim 1 in which the aqueous phase of the emulsion concentrate is adjusted to a pH between 2.5 and 6.

10. Process according to claim 9 wherein the pH of the concentrate is between 3.5 and 5.

11. Process according to claim 9, in which the pH is adjusted by the addition of citric acid.

12. Process for the preparation of a soft drink in which an emulsion concentrate prepared according to claim 1 is diluted with an acidified aqueous solution of a sugar or an artificial sweetener.

13. An emulsion concentrate comprising an aqueous extract of crushed defatted citrus seeds as the continuous phase of a flavour mixture comprising at least one member of the group consisting of an essential oil of the peel of least one citrus fruit and an organoleptically neutral oil as the discontinuous phase.

14. A soft drink obtainable by diluting an emulsion concentrate according to claim 13 with an acidified aqueous solution of a sugar or of an artificial sweetener.

15. Process for the preparation of an emulsion concentrate for soft drinks which comprises defatting citrus fruit seeds with organic solvent; crushing the defatted seeds; mixing the defatted seeds with water acidified with citric acid; filtering to remove solids and obtain an aqueous extract from the defatted seeds; pre-mixing said aqueous extract with a flavour mixture comprising at least one member of the group consisting of an essential oil of the peel of citrus fruit and an organoleptically neutral oil and then homogenizing said pre-mix to form a stable emulsion.

16. The process of claim 15 wherein ester gum is added to the aqueous extract in the pre-mixing.

* * * * *